United States Patent
Eguchi et al.

(10) Patent No.: US 9,374,403 B2
(45) Date of Patent: *Jun. 21, 2016

(54) MEDIA STREAM FRAGMENT REQUEST

(71) Applicant: Adobe Systems Incorporated, San Jose, CA (US)

(72) Inventors: Glenn Eguchi, Albuquerque, NM (US); Asa Whillock, San Francisco, CA (US); Kevin Streeter, San Bruno, CA (US); Srinivas Manapragada, San Ramon, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/749,162

(22) Filed: Jun. 24, 2015

(65) Prior Publication Data

US 2015/0295969 A1 Oct. 15, 2015

Related U.S. Application Data

(63) Continuation of application No. 13/536,274, filed on Jun. 28, 2012, now Pat. No. 9,100,460.

(51) Int. Cl.
*G06F 15/173* (2006.01)
*H04L 29/06* (2006.01)

(52) U.S. Cl.
CPC .......... *H04L 65/4069* (2013.01); *H04L 65/105* (2013.01); *H04L 65/4092* (2013.01); *H04L 65/605* (2013.01); *H04L 67/42* (2013.01)

(58) Field of Classification Search
CPC .. H04L 65/4092; H04L 65/605; H04L 65/105
USPC ......................................... 709/200, 203, 231
See application file for complete search history.

(56) References Cited

U.S. PATENT DOCUMENTS

| | | | |
|---|---|---|---|
| 7,324,555 B1 * | 1/2008 | Chen ................... | H04N 7/17336 348/E5.008 |
| 7,751,404 B2 * | 7/2010 | Pullen ................. | H04L 12/2801 370/394 |
| 8,001,261 B2 * | 8/2011 | Katis ........................ | H04L 51/04 370/395.64 |
| 8,423,606 B1 | 4/2013 | Streeter et al. | |
| 2001/0034788 A1 * | 10/2001 | McTernan ......... | G06F 17/30905 709/232 |
| 2002/0003881 A1 | 1/2002 | Reitmeier et al. | |
| 2004/0184442 A1 * | 9/2004 | Jones ..................... | H04B 7/155 370/351 |
| 2004/0221138 A1 | 11/2004 | Rosner et al. | |
| 2004/0255219 A1 * | 12/2004 | Grossman, IV ....... | H04L 1/1628 714/748 |
| 2005/0058131 A1 * | 3/2005 | Samuels ................. | H04L 12/24 370/389 |
| 2005/0083924 A1 * | 4/2005 | Dillinger ............. | G06F 11/1433 370/389 |
| 2006/0104279 A1 * | 5/2006 | Fellman .............. | H04L 12/2854 370/392 |

(Continued)

Primary Examiner — Anthony Mejia
(74) Attorney, Agent, or Firm — Finch & Maloney PLLC

(57) ABSTRACT

Methods, systems, and apparatus, including computer programs encoded on a computer storage medium, for requesting potentially missing fragments in a media stream index are described in this specification. In one aspect, a method includes receiving a fragmented media stream index at a client system, where the media stream index includes a list of sequentially arranged fragment identifiers. Fragments listed in the media stream index can be requested from a server system. Fragment identifiers that are potentially missing in the media stream index can be identified based, at least in part, on a determined naming convention indicating the sequential arrangement of the fragment identifiers. Fragments can be requested based on the potentially missing fragment identifiers and processed for display when received.

20 Claims, 6 Drawing Sheets

(56) References Cited

U.S. PATENT DOCUMENTS

| | | | |
|---|---|---|---|
| 2006/0104300 A1* | 5/2006 | Ho | H04L 1/0083 370/428 |
| 2006/0230305 A1* | 10/2006 | Smith | H04L 12/66 714/4.4 |
| 2007/0118873 A1 | 5/2007 | Houh et al. | |
| 2008/0193099 A1 | 8/2008 | Nakai et al. | |
| 2010/0085966 A1* | 4/2010 | Samuels | H03M 7/3084 370/389 |
| 2010/0094964 A1 | 4/2010 | Zuckerman et al. | |
| 2010/0094971 A1 | 4/2010 | Zuckerman et al. | |
| 2010/0094972 A1* | 4/2010 | Zuckerman | H04L 67/1008 709/219 |
| 2010/0180315 A1* | 7/2010 | Nakamichi | H04N 17/004 725/116 |
| 2010/0235528 A1* | 9/2010 | Bocharov | H04N 21/6437 709/231 |
| 2010/0262883 A1* | 10/2010 | Arimilli | G06F 9/546 714/748 |
| 2010/0333132 A1* | 12/2010 | Robertson | G11B 27/034 725/32 |
| 2011/0083144 A1 | 4/2011 | Bocharov et al. | |
| 2012/0047283 A1* | 2/2012 | Plamondon | H03M 7/30 709/247 |
| 2012/0124618 A1* | 5/2012 | Ruiz-Velasco | G06Q 30/0241 725/32 |
| 2012/0179788 A1 | 7/2012 | McGowan | |
| 2013/0088979 A1* | 4/2013 | Bi | H04B 7/024 370/252 |
| 2013/0290402 A1* | 10/2013 | Gavade | H04N 21/26258 709/203 |
| 2014/0006364 A1* | 1/2014 | Eguchi | H04N 21/2323 707/693 |

* cited by examiner

MEDIA STREAM FRAGMENT REQUEST

This application is a continuation of U.S. patent application Ser. No. 13/536,274 (filed 28 Jun. 2012), the entire disclosure of which is incorporated by reference.

BACKGROUND

This specification relates to requesting fragments of a media stream.

Hypertext Transfer Protocol (HTTP) has become a standard protocol for Web communications. Consequently, technologies for optimizing HTTP delivery of content have been developed and have become available. Such optimized delivery has become widely accessible as it relies mostly on standard HTTP server systems that are widely supported in content delivery networks.

The basic principles of HTTP streaming involve using software on an origin server system of a content delivery network to split a media stream into small fragments (also referred to as segments or chunks) saved as separate files, and to create a playlist (e.g., a master list, fragment list, or media stream index) for informing a media player client which files to get to make up a complete media stream, and where the files are located (e.g., via uniform resource locators). The media player client can download the files and can play the small fragments included in the downloaded files in an order specified by the playlist.

In HTTP Dynamic Streaming (HDS), playback of a media stream should be as robust as possible taking into account possible server-side issues. Playback at the client can suffer from occurrences, such as "liveness" or "dropout", regardless of the built-in backend redundancy of the server systems. Liveness can occur when a server system advertises an index (e.g., fragment list) of a media stream that is not current (e.g., a "stale" view of a live media stream), and dropout can occur, when a server system's index of a media stream has gaps (e.g., the index is missing a range of fragment identifiers).

SUMMARY

This specification describes technologies relating to requesting fragments of a media stream.

In general, one innovative aspect of the subject matter described in this specification can be embodied in methods that include the actions of receiving an index of a media stream at a client system, where the media stream can be fragmented into multiple sequentially arranged fragments. Each of the fragments can be associated with an identifier and the index can include a list of sequentially arranged fragment identifiers corresponding to at least a portion of the multiple sequentially arranged fragments. Fragments of the media stream can be requested based on the received index and at least a portion of the requested index based fragments of the media stream can be received from a server system. Fragment identifiers that are potentially missing from the received index can be identified, where the identifying can include identifying a gap in the list of sequentially arranged fragment identifiers based, at least in part, on a determined naming convention that indicates the sequential arrangement of the fragment identifiers. Potentially missing fragments associated with the potentially missing fragment identifiers can be requested from the server system, where requesting of potentially missing fragments can occur in series until a predetermined number of requests fail to return a potentially missing fragment. Fragments associated with the potentially missing fragment identifiers can be received. The received index based fragments and the received fragments associated with the potentially missing fragment identifiers can be processed for display.

In some implementations, the potentially missing fragments can be requested through a server operable to request the fragments of the media stream from one or more origin servers. In some implementations, identifying the gap can include identifying a last fragment in the list of sequentially arranged fragment identifiers based, at least in part, on the determined naming convention. In some implementations, the method can further include the actions of storing the received index based fragments of the media stream in a buffer for the processing, where requesting the potentially missing fragments can be based, at least in part, on a minimum threshold fill level of the buffer during the processing. In some implementations, the method can further include the actions of identifying an end of media stream indicator in the received index and terminating the requesting the potentially missing fragments based on the end of media stream indicator.

In some implementations, requesting the potentially missing fragments occurring in series can include requesting a first potentially missing fragment corresponding to a sequential increment to a last available fragment identifier in the list of sequentially arranged fragment identifiers before the identified gap, and requesting a second potentially missing fragment corresponding to a next sequential increment to the first potentially missing fragment. In some implementations, the sequential increment and the next sequential increment can be based, at least in part, on the determined naming convention.

In some implementations, the identified gap can include a range of potentially missing fragment identifiers and requesting the potentially missing fragments occurring in series can include requesting a first potentially missing fragment within the range of potentially missing fragment identifiers corresponding to a predetermined increment to a last available fragment identifier in the list of sequentially arranged fragment identifiers before the identified gap, and a second potentially missing fragment corresponding to a next predetermined increment to the first potential missing fragment identifier. In some implementations, the predetermined increment and the next predetermined increment can be based, at least in part, on the range of potentially missing fragment identifiers.

In some implementations, the determined naming convention can include at least one of a time stamp or a numbering scheme. In some implementations, receiving the index can include receiving portions of the index after receiving the index. In some implementations, the predetermined number of failed requests can be two. In some implementations, requesting the potentially missing fragments can include requesting a fragment based on an expected time value, where the fragment can have an associated fragment identifier. In some implementations, the method can further include the actions of requesting the fragment based on (i) incrementally smaller fragment identifiers and (ii) incrementally greater fragment identifiers, than the associated fragment identifier until a predetermined number of requests fail to return the fragment.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. This technology can add robustness to playback of media streams on client systems when streaming media (e.g., a live video/audio stream) by configuring a client system to request fragments that are not referenced in a media stream index, but are expected to be present. The client system can detect gaps in the media stream index, for example, caused by dropout and liveness occurrences, within the presented media stream index and obtain fragments corresponding to the detected gaps, and therefore enable a media player device of the client system to continue smooth playback of a media stream regardless of issues with the server system initially providing the media stream, thus enhancing the viewer's experience.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
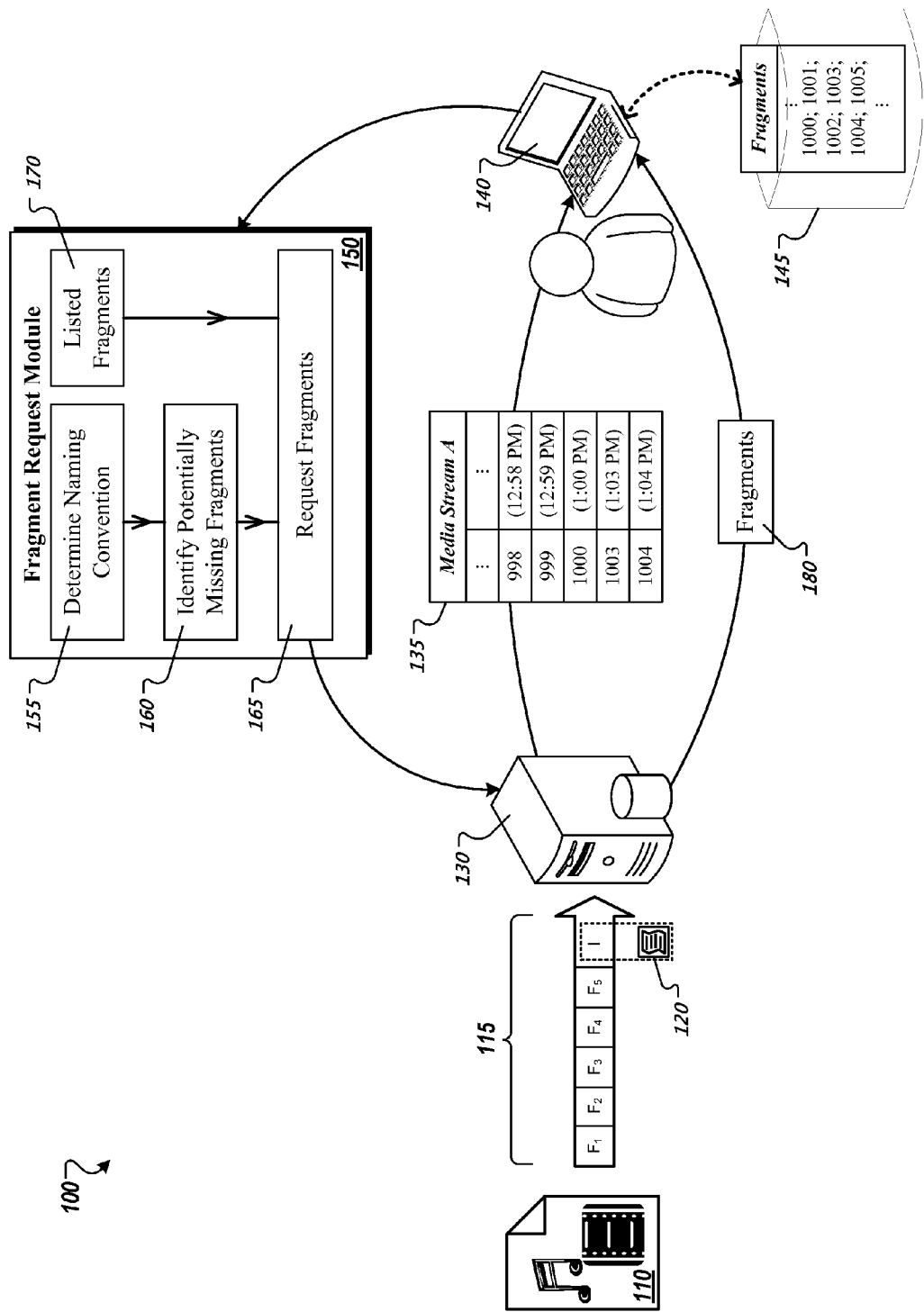
FIG. 1 shows an example of a system for requesting potentially missing fragments of a media stream.

A client system, such as a computing device that runs a media player, can initiate playback of a media stream (e.g., a video/audio live stream, HTTP live stream, etc.). A media stream may, but need not, correspond to a file. A media stream may be stored in a portion of a file that holds other media streams, in a single file dedicated to the media stream in question, or in multiple coordinated files. The media stream can be fragmented into sequentially arranged parts (i.e., fragments or chunks) that are mapped in a media stream index in sequential order. Playback of a fragmented media stream at the client system can suffer from occurrences, such as liveness or dropout, regardless of the built-in backend redundancy of the server systems.

In some implementations, an encoder can receive a media stream from a source (e.g., a camera, smart phone, or any device capable of creating a media stream), and serve the media stream to one or more server systems (e.g., origin servers). In some implementations, the one or more server systems can be communicatively coupled to a proxy (e.g., a reverse proxy server system) through a network. A client system, or a component thereof (e.g., a media player), can request the media stream from the proxy. The proxy can be configured to request the media stream from a server system communicatively coupled to the proxy. In some implementations, the client system can be a server system.

The client system can be configured to support a live offset of a predetermined number of fragment intervals. For example, the client system can be configured to store a specified number of fragments in a buffer storage medium associated with the client system. The buffer storage medium can be part of a storage system, e.g., a hard drive, a storage area network (SAN), a network-attached storage (NAS), or the like.

Liveness can occur when a server system (e.g., an origin server system) advertises an index of a media stream that is not current (e.g., a "stale" view of a live media stream). For example, if a connection between an encoder and one of the server systems fails and is not restored (e.g., for a duration of media stream fragments buffered in a repository), but the connection between this particular server system and a proxy continues running, the server system would no longer receive the media stream from the encoder and the media stream index received by the server system before the connection between the encoder and the server system failed may indicate that the last fragment listed in the media stream index is the most recent fragment even though more recent fragments may be available on other server systems.

The client system can initiate playback (e.g., live video/audio playback) of the media stream and request the most recent index for the media stream from the proxy. If the proxy requests the media stream from the server system with the failed connection to the encoder, the client may receive a "stale" media stream index from the proxy. The client can begin requesting and playing the fragments listed in the media stream index received from the server system, and the playback may stall at the last fragment identified in the media stream index because the client is unaware that more recent fragments may be available on a different server system. Liveness can occur in a number of other scenarios, for example, when different server systems receive a different encoder input and one of the encoders fails, when a media server system (e.g., a FLASH® Media Server system) fails, or when a significant amount of latency between encoder and server system is present.

Dropout can occur when a server system advertises a media stream index that has gaps in the sequential arrangement of fragments. For example, when an encoder is streaming media to one or more server systems and the connection with one of the server systems fails for a short amount of time (e.g., for multiple fragment intervals) and is then restored, the stream to the server system may have been interrupted, and the media stream index on the server system may miss entries for fragments processed by the encoder while the connection had failed.

The client system can initiate playback (e.g., live video/audio playback) of the media stream and request the most recent media stream index from the proxy. If the proxy requests the media stream index from the server system that had a failed connection with the encoder, the client system would receive a media stream index with a gap of entries of fragment identifiers corresponding to the duration of the failed connection and may not request fragments corresponding to the missing entries in the media stream index. Playback at the client system may stall, or skip over the missing fragments.

FIG. 1 shows an example of a system 100 for requesting potentially missing fragment identifiers. The system 100 can include server systems (e.g., origin server systems), such as server system 130, and a client system 140 that are communicatively coupled through a communication network (e.g., a packet switched communication network), either directly, or through a proxy or a single universal resource identifier. The communication network can be private, e.g., a company, local or wide area network, or public, e.g., the Internet. Communications between the server systems and/or proxy, and the client system can be in accordance with Hypertext Transfer Protocol (HTTP), Real-Time Messaging Protocol (RTMP), Real-Time Streaming Protocol (RTSP), and the like.

The server system 130 can receive a media stream 110. The media stream 110 can be video that includes a timed sequence of image frames and audio data. In some implementations, the server system 130 can store the media stream 110 to be streamed on demand to the client system 140. In this case, the server system 130 can store the media stream 110 on persistent storage medium associated with the server system 130. The storage medium associated with the server system 130 can be part of a storage system, e.g., a hard drive, a storage area network (SAN), a network-attached storage (NAS), or the like.

In some implementations, the server system 130 can be connected to one or more media stream sources (e.g., media stream encoder and/or media stream packager) that are associated with one or more image/audio capture systems, such as video cameras. In this case, the media stream sources can process the captured images, generate one or more media streams from the processed images and stream live or near-live the one or more generated media streams to the server system 130.

In some implementations, the media stream 110 can be generated and/or stored as multiple fragments 115. The fragments 115 of the media stream 110 can include video data having playback duration (e.g., 10 or 15 seconds). The fragments 115 of the media stream 110 can be sequentially arranged such that the fragments can be processed in a defined order. For example, the fragments 115 can be arranged by a sequential numbering scheme (e.g., 998, 999, 1000, 1001, etc.), by time stamps (e.g., 1:00 PM, 1:01 PM; 1:02 PM, etc.), by time offsets (e.g., 5 sec., 10 sec., 15 sec.), or a combination of these. The media stream 110 can include a media stream index 120 (e.g., a fragment list) mapping the sequential order of the fragments.

In some implementations, the media stream index 120 maps the fragments of the media stream to corresponding indicators of storage locations where the respective files of the fragments listed in the media stream index 120 are stored. In some implementations, the storage location indicators can be uniform resource locator (URL) addresses that refer to the respective fragment file locations. The media stream index 120 can include, but is not limited to, information related to the media stream, such as fragment identifiers, time stamps, time offsets, time values, end of media stream indicators, fragment locators (e.g., uniform resource locators), and a name or title of the media stream.

The server system 130 can receive and store a version 135 of the media stream index 120. The media stream index 135 can be received from a media stream source (e.g., media stream encoder and/or media stream packager) that is associated with a video/audio capture system (e.g., video camera, smart phone, etc.). The media stream index 135 can be updated as new fragment information is available from the media stream source. Even though the media stream index 135 can be based on the media stream index 120, the contents of the media stream index 135 and 120 may be different, for example, because of connection stability or configuration between the media stream source and the server system 130.

The client system 140 can request an index for the media stream 110, either directly from the server 130 or through a proxy and, for example, retrieve media index 135. The client system 140 can request media stream fragments based on the received media stream index 135 for playback. In some implementations, the client system 140 can include a fragment request module 150 to analyze the received media stream index 135 and request fragments based on the analysis. For example, the fragment request module 150 of the client system 140 can determine a naming convention 155 indicating the sequential arrangement of the fragment identifiers (e.g., 998, 999, 1000, etc.) in the media stream index 135.

The naming convention 155 can be based on a numbering scheme, time stamps, time offsets, or any other method for indicating a sequential arrangement of the media stream fragments. In some implementations, the fragment request module 150 can identify potentially missing fragment identifiers 160 in the media stream index 135, for example, based on the determined naming convention 155 indicating the sequential arrangement of the media stream fragment identifiers.

The fragment request module 150 can submit a request 165 for fragments of the media stream 110 to a server system 130, either directly or through a proxy. The request 165 for fragments of the media stream 110 can include fragments that are listed 170 in the media stream index 135 and fragments that correspond to the identified potentially missing fragment identifiers 160. The server system 130 receiving the request 165 for the fragments can respond to the request. For example, the server system 130 can respond to the request 165 by returning one or more fragments 180 of the media stream 110 corresponding to the fragment identifiers listed 170 in the media stream index 135 and/or the potentially missing fragment identifiers 160 to the client system 140, either directly or through a proxy.

The fragments 180 that are received by the client system 140 can be stored, for example, in a repository 145 (e.g., a buffer storage) associated with the client system. In some implementations, requesting the potentially missing fragments can be initiated when the stored fragments available in the repository 145 fall below a minimum threshold level (e.g., based on available playback duration, storage capacity, or repository fill level).

Figure 2:
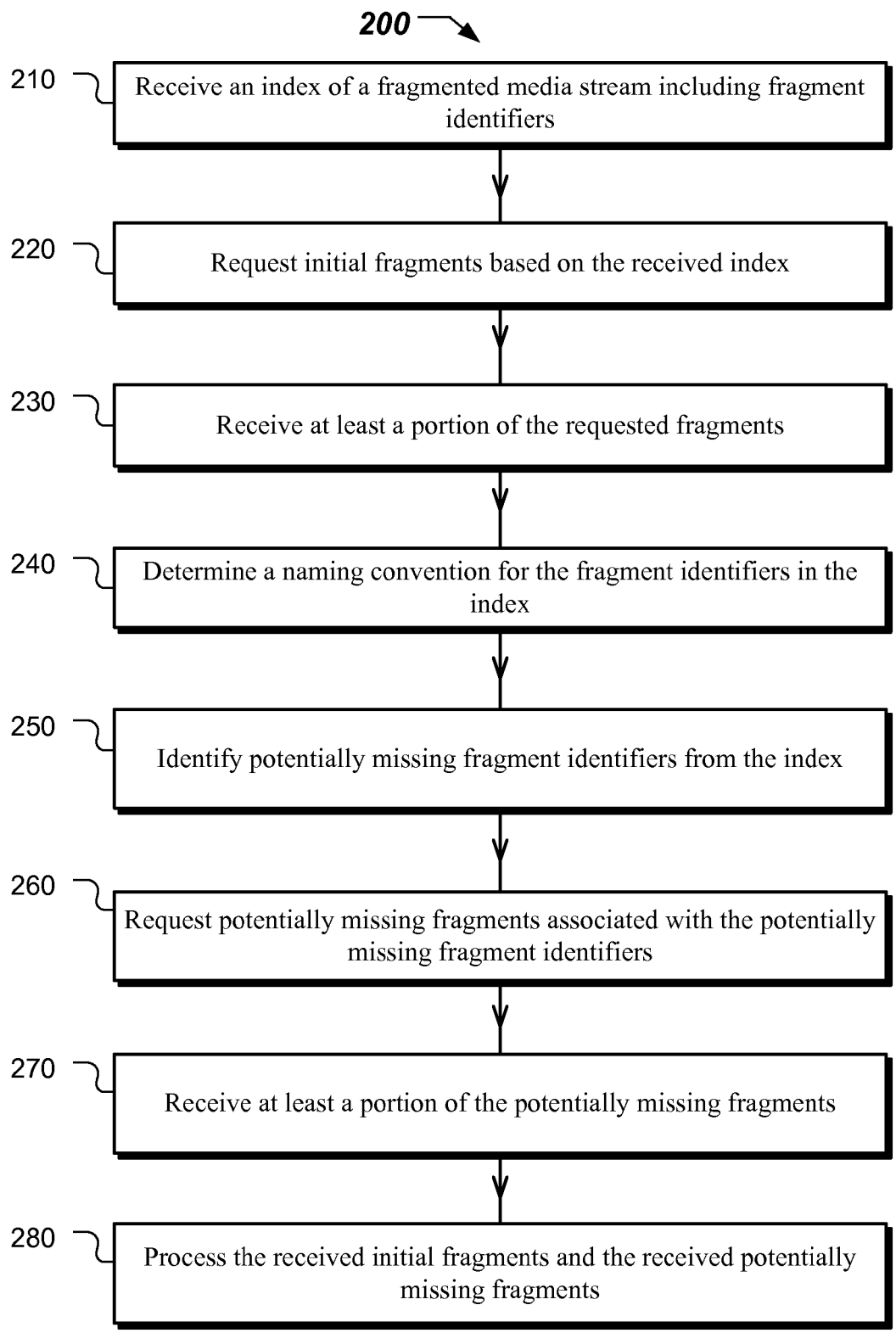
FIG. 2 shows an example of a process for requesting potentially missing fragments of a media stream.

FIG. 2 shows an example of a process 200 for requesting potentially missing fragments of a media stream. The process 200 can be implemented, for example, at client systems, such as client system 140. Additionally, process 200 can be implemented at a server system or proxy. A media stream index can be received 210. The media stream corresponding to the media stream index can be fragmented into sequentially arranged fragments. The media stream index can include fragment run entries and information, such as fragment identifiers, time stamps, time offsets, time values, end of media stream indicators, fragment location (e.g., uniform resource locator), media stream name, or other information related to the media stream. In some implementations, the media stream index can map the sequential arrangement of the fragments, for example, based on the fragment identifiers, time stamps, or time offsets.

In some implementations, media stream fragments corresponding to fragment identifiers listed in the media stream index can be requested 220. The request of media stream fragments can be based on a buffer storage capacity at the client system and/or time stamps associated with the fragment identifiers. At least a portion of the requested media stream fragments can be received 230 and, for example, stored in the buffer storage for processing.

In some implementations, a client system receiving the media stream index can initiate a validation process of the media stream index. For example, the validation process can be initiated at the time the client system, or a component thereof, (e.g., a media player device) initiates playback of the media stream. A naming convention for the fragment identifiers in the media stream index can be determined 240. The naming convention can indicate the sequential arrangement of the fragment identifiers, for example, based on a numbering scheme (e.g., 998, 999, 1000, etc.), time stamps (e.g., 1:00 pm, 1:01 pm, 1:02 pm, etc.), time offsets (e.g., 5 sec., 10 sec., 15 sec., etc.), or a combination thereof.

In some implementations, fragment identifiers that are potentially missing in the media stream index can be identified 250 by analyzing the media stream index. For example a discontinuity in the media stream index can be identified based on a time stamp of a last update of the media stream index or a time stamp of a last fragment identifier listed in the media stream index when no end of media stream indicator is present. In this case, the client system may expect that the fragment identifiers continue in the sequential order indicated by the naming convention beyond the last fragment identifier in the media stream index until an end of media stream indicator has been received.

A discontinuity in the media stream index can also be identified based on a gap of fragment identifiers within the media stream index. In this case, the client system may expect that the fragment identifiers continue in the sequential order indicated by the naming convention between the last fragment identifier before the gap and the first fragment identifier after the gap.

Media stream fragments corresponding to the potentially missing fragment identifiers can be requested 260. In some implementations, fragments corresponding to the potentially missing fragment identifiers can be requested until no further potentially missing fragment identifiers have been identified or a specified number of failed requests have been returned. For example, the number of failed requests can be set to two for expediency, to one for maximum sensitivity, or a higher value such as 5 for increasing the recovery probability for missing fragments. The requested potentially missing fragments can be received 270 and, for example, stored in the buffer storage along with the received fragments 230 based on the index.

In some implementations, the client system can revert to requesting fragments corresponding to fragment identifiers that are listed in the media stream index once all missing fragments have been received or the specified number of failed requests has been returned. The received fragments based on the index and the received fragments based on the potentially missing fragment identifiers can be processed 280, for example by the client system, or a component thereof (e.g., a media player device).

In some implementations, media stream recovery processes can be performed in primary or alternate audio streams, or both, and if a gap in an audio stream is detected, but not in the video stream, the video stream can be advanced (e.g., through a fast forward function) until the audio stream is again available. In some implementations, where a gap in a video stream has been identified, but not in the audio stream, the video stream can be stalled while the audio stream is played back and video stream playback can resume when video is again available.

Figure 3:
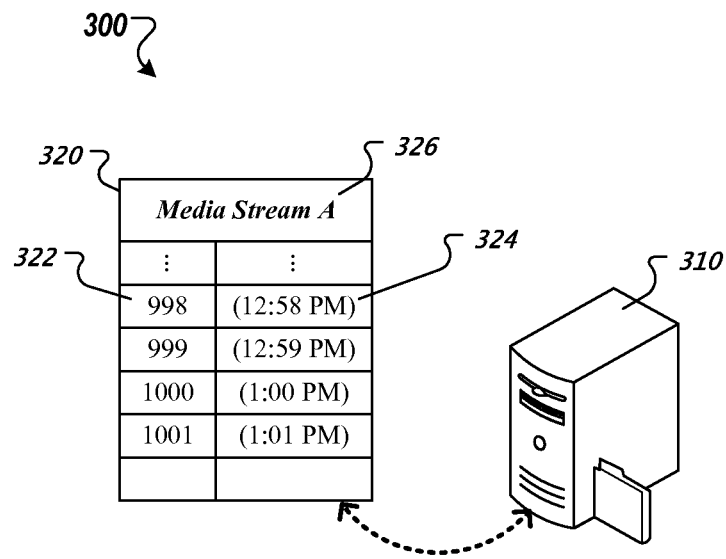
FIG. 3 shows an example of a media stream index with potentially "stale" fragment identifiers (liveness).

FIG. 3 shows an example 300 of a media stream index 320 with potentially stale fragment identifiers. The media stream index 320 available on a client system 310 can, amongst other information, include a media stream name 326 (e.g., "Media Stream A"), fragment identifiers 322, and time stamps 324. In some implementations, the fragment identifiers 322 can include or be equivalent to the time stamps 324. The fragment identifiers 322 can be sequentially arranged (e.g., 998, 999, 1000, etc.) and correspond to the time stamps 324 (e.g., 12:58 PM, 12:59 PM, 13:00 PM, etc.).

The media stream index 320 can be analyzed by a process 200 as described above with respect to FIG. 2. In this example, the analysis of the media stream index 320 may show that the media stream index 320 is potentially "stale" (i.e., suffers from liveness), if the index does not include an end of media stream indicator and the time stamp 324 of the last fragment listed in the media stream index 320 is older than a specified time value (e.g., fragment duration or multiples thereof) based on a current time value.

In some implementations, a recovery procedure can be initiated upon determining that the media stream index 320 is potentially "stale". For example, the client system 310 may expect that the fragment identifiers 322 continue in the same sequential order and increments (e.g., 998, 999, 1000, 1001 indicates an increment of 1) or that a next expected time stamp 324 has the same temporal separation (e.g., 12:58 PM, 12:59 PM, 1:00 PM, 1:01 PM indicates a temporal separation of 1 minute) as shown in the media stream index 320.

The client system 310 can attempt to obtain fragments corresponding to the potentially missing fragment identifiers in sequential order, for example from a proxy or server system, beyond the fragments identified in the media stream index 320 until a last missing fragment has been received, successive errors when requesting the potentially missing fragments have been returned, or a time stamp of the last requested fragment is within a specified time interval of a current time value (e.g., at the live point of the media stream).

Figure 4:
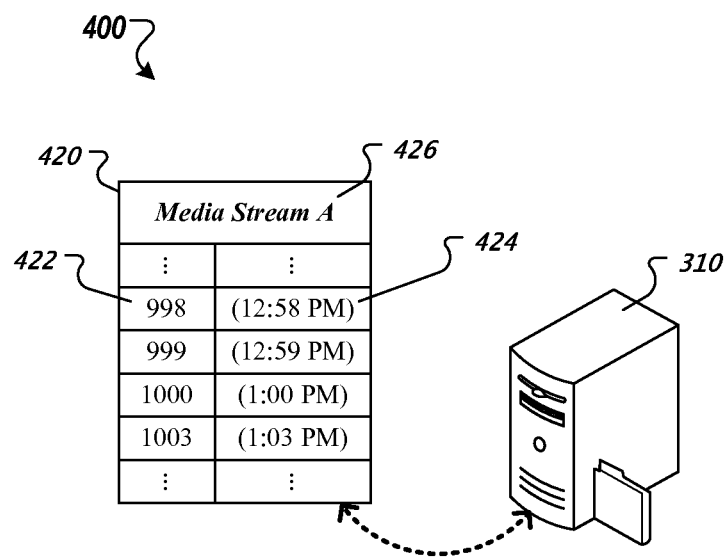
FIG. 4 shows an example of a media stream index with potentially "dropped" fragment identifiers (dropout).

FIG. 4 shows an example 400 of a media stream index 420 with potentially dropped fragment identifiers. A media stream index 420 available on a client system 410 can, amongst other information, include a media stream name 426 (e.g., "Media Stream A"), fragment identifiers 422, and time stamps 424. The fragment identifiers 422 can be sequentially arranged (e.g., 998, 999, 1000, etc.) and correspond to the time stamps 424 (e.g., 12:58 PM, 12:59 PM, 13:00 PM, etc.).

The media stream index 420 can be analyzed by a process 200 as described above with respect to FIG. 2. In this example, the analysis of the media stream index 420 may show that the media stream index 420 is potentially missing fragment identifiers based on the sequential arrangement of the fragment identifiers 422 or the time stamps 424. For example, the analysis can show that the sequentially arranged fragment identifiers 422 are incremented by 1 (i.e., 998, 999, 1000) until the fragment identifier 1000. The next fragment identifier listed in the media stream index 420 is 1003, which indicates that fragment identifiers 1001 and 1002 are potentially missing from the media stream index 420. An analysis of the time stamps 424 may produce a similar result, indicating that fragment identifiers corresponding to the time stamps 1:01 PM and 1:02 PM are potentially missing.

In some implementations, a recovery procedure can be initiated upon determining that the media stream index 420 is potentially missing fragment identifiers. For example, the client system 410 can attempt to obtain every fragment corresponding to a discontinuity of the sequential arrangement of the fragment identifiers 422, or the time stamps 424, in sequential order, until a last missing fragment has been received or successive errors when requesting the potentially missing fragments have been returned.

In some implementations, the throughput of fragment traffic generated as a result of recovery procedures can be limited such that the client system, server systems, and networks are not overloaded (e.g., if a large number of fragments is missing on a client system or a failure affects multiple server systems or sub networks). For example, a client system requesting potentially missing fragments can monitor the number of generated fragment requests within a given time frame and wait for a specified time interval before submitting another request.

In some implementations, a client system can attempt to obtain fragments within a range of potentially missing fragment identifiers based on increments of fragment identifiers in non-sequential order (e.g., exponential, random, or Fibonacci number increments). For example, types of increments can be predefined or dynamically determined based on a size or range of an identified gap.

Figure 5:
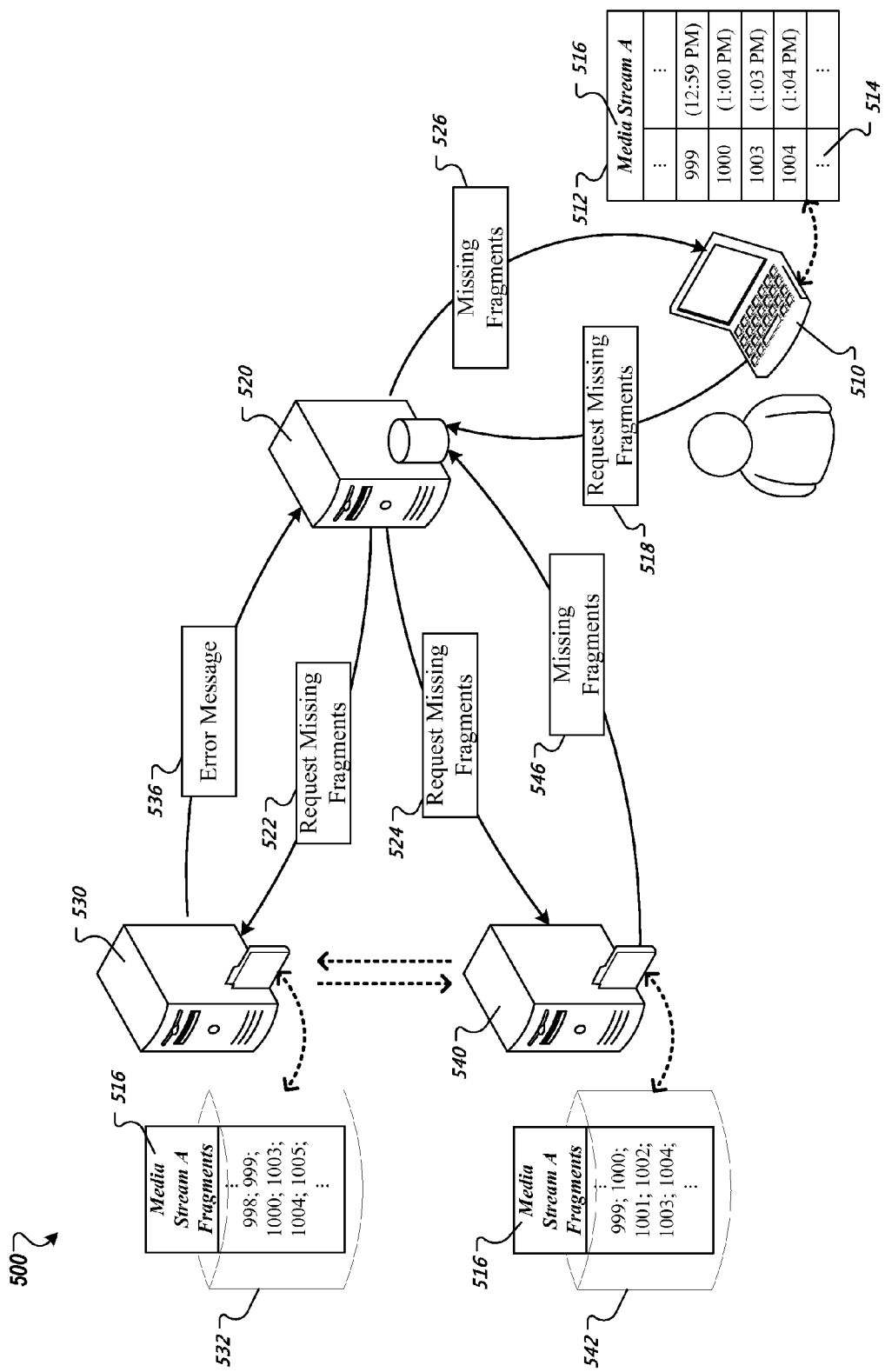
FIG. 5 shows an example of a failover system for requesting potentially missing fragments.

FIG. 5 shows an example of a failover system 500 for requesting media stream fragments. In some implementations, client systems, such as client system 510 and server systems, such as server systems 530 and 540, can be communicatively coupled to a proxy 520 (e.g., a reverse proxy server system). A client system connected to the proxy can submit a request for a media stream to the proxy, and the proxy can attempt to retrieve the media stream from one or more of the server systems connected to the proxy. In some implementations, the proxy can submit the request for the media stream to a different server system upon receiving an error message from the server system to which the request was initially transmitted.

For example, with the above described process, client system 510 can identify that a media stream index 512, available on the client system 510, of the media stream 516 is potentially missing fragment identifiers 1001 and 1002, based on the sequentially arranged fragment identifiers 514. The client system 510 can submit a request 518 to a proxy 520 for media stream fragments corresponding to the potentially missing fragment identifiers 1001 and 1002.

The proxy 520 can request the fragments 1001 and 1002 of the media stream 516 from the server systems connected to the proxy. In this example, when proxy 520 submits a request 522 for the fragments 1001 and 1002 of the media stream 516 to the server system 530, the server system 530 may return an error message 536 (e.g., a 503 error message) to the proxy 520, because the server system 530 does not store the requested fragments 1001 and 1002 for the media stream 516 media stream, for example in a repository 532 associated with the server system 530.

Upon receiving the error message from the server system 530, the proxy 520 can submit another request 524 to the server system 540 for the fragments 1001 and 1002 of the media stream 516. In this example, the server system 540 stores the requested fragments 1001 and 1002 of the media stream 516, for example in a repository 542 associated with the server system 540, and can return 546 the requested fragments 1001 and 1002 to the proxy 520. The proxy 520 can return 526 the requested fragments 1001 and 1002 of the media stream 516 to the client system 510. In some implementations, the proxy 520 can submit a request to another server system when the server system to which the request was initially submitted fails to return a response (e.g., the requested fragments or an error message) within a defined time interval.

In some implementations, a proxy can be configured to request fragments from every server system connected to the proxy until all requested fragments are returned to the proxy, or every connected server system returns an error message. When every server system connected to the proxy returns an error message (or otherwise fails to respond), the proxy can generate an error message and return the error message to the requesting client system indicating that the requested fragments do not exist. In some implementations, the proxy caches the error message for a short amount of time (e.g., less than a fragment interval). For example, upon determination that the error message reflects a true missing fragment the error message can be cashed to avoid constant searching on the server system for the missing fragment. The period of time for caching the error can be limited to allow additional searches for a potentially missing fragment in the case the missing fragment becomes available can be retrieved.

Figure 6:
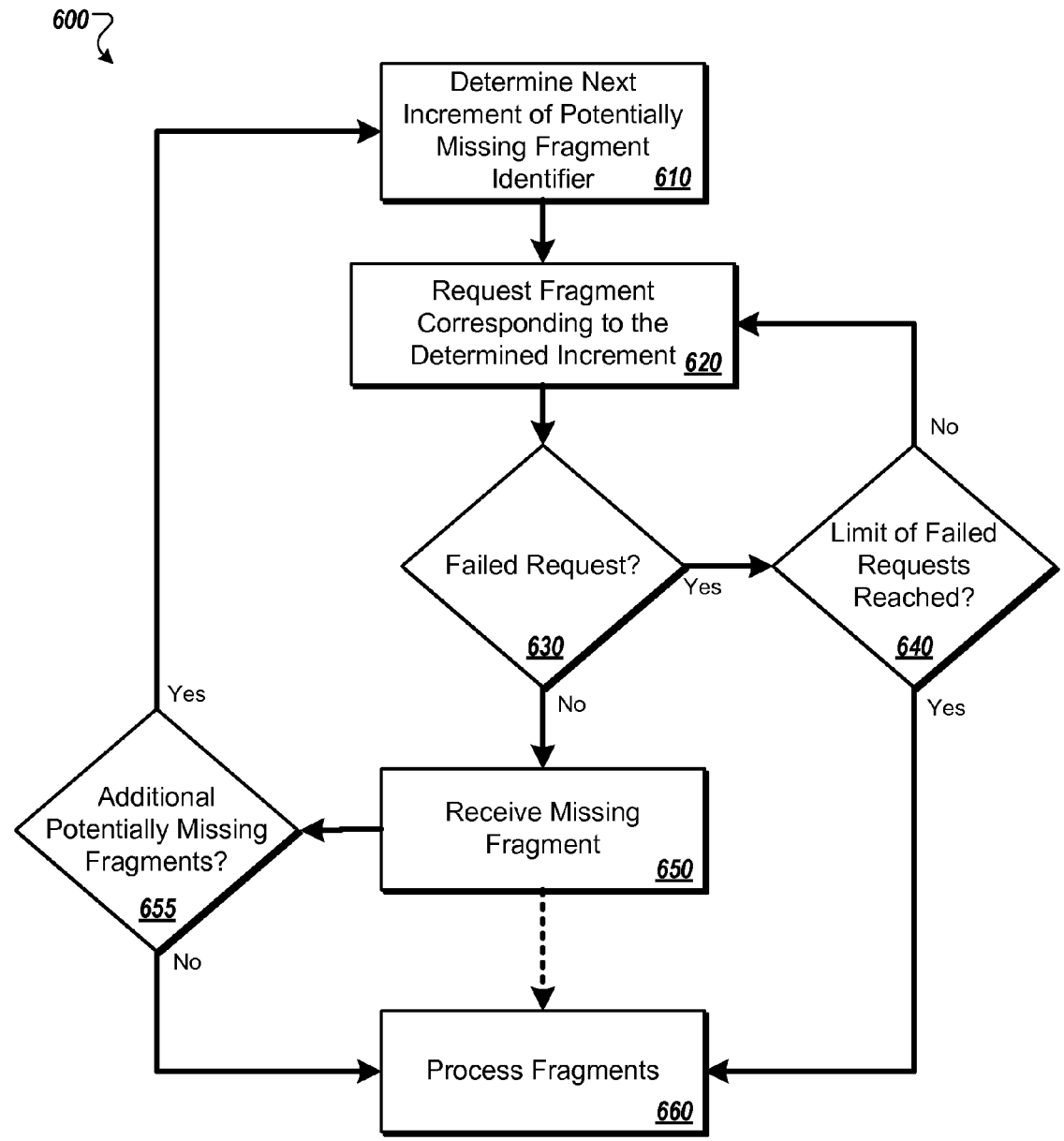
FIG. 6 shows an example of a process for requesting potentially missing fragments of a media stream based on fragment identifiers.

FIG. 6 shows an example of a process 600 for requesting potentially missing fragments of a media stream based on the sequential arrangement of fragment identifiers. Potentially missing fragment identifiers in a media stream index can be identified as described above. Upon identification of a gap (e.g., a range of potentially missing fragment identifiers), a next expected increment of a fragment identifier within the gap can be determined 610. For example, the next expected increment of a potentially missing fragment identifier can be based on a naming convention derived from sequentially arranged fragment identifiers in the media stream index. The naming convention can be based, for example, on a numbering scheme (e.g., 998, 999, 1000, 1001, etc.), time stamps (1:00 PM, 1:01 PM, 1:02 PM, etc.), time offsets (e.g., 5 sec., 10 sec., 15 sec., etc.), or combination thereof.

In some implementations, a first potentially missing fragment can be associated with a next sequential increment of a fragment identifier based on the naming convention. For example, when, based on the naming convention, the expected increment of fragment identifiers is 1 (e.g., sequential fragment identifiers 998, 999, 1000, 1001 indicate an increment between fragment identifiers of 1) and a last fragment identifier in a media stream index before an identified gap is 1001, the next sequential increment of a potentially missing fragment identifier would be 1002.

A fragment corresponding to the next expected increment of a potentially missing fragment identifier can be requested 620. In some implementations, requests for potentially missing fragments can be limited in order to preserve system or network resources (e.g., a request for a particular missing fragment is only submitted once within a defined timeframe). When the request 630 succeeds and the requested fragment corresponding to the potentially missing fragment identifier can be retrieved 650, the fragment can be stored, for example, in a buffer storage, for processing 660 and the recovery process can continue if additional potentially missing fragment 655 have been identified. When the identified gap extends past the last received fragment and additional potentially missing fragments 655 have been identified, another potentially missing fragment corresponding to the next sequential increment, in this example 1003, can be requested.

Requesting fragments corresponding to potentially missing fragment identifiers can continue until all potentially missing fragments have been received 655 or until a limit of failed requests has been reached 640. In some implementations, the limit for a number of failed requests 640 can be specified by a user (e.g., an administrator) or based on a size of the identified gap. For example, if the limit of failed requests 640 is set to two, and the requests for fragments corresponding to the potentially missing fragment identifiers 1001 and 1002 fail, the recovery procedure can be aborted until a next dropout or liveness occurrence is identified.

The following example illustrates, but does not limit, the above described process 600 with respect to a "stale" media stream index (liveness). In this example, a client system plays back a media stream by requesting fragments listed in a media stream index. When approaching the final fragment in the received media stream index, and no end of media stream indicator is present, the client system attempts to sequentially retrieve fragments beyond those specified in the media stream index. When a request is successful, the returned fragment(s) can be buffered and processed in sequential order. When more than a defined number of requests fail to return a fragment, the media stream recovery process can be aborted.

For example, a media stream index that a client system received from a server system 1 through a proxy may reference consecutive sequentially arranged fragment identifiers from 1 to 100 (incremented by 1). The client system requests fragments corresponding to the fragment identifiers, and the last buffered fragment is fragment 98. The maximum number of failed requests is set to 2. The media stream index includes no end of media stream indicator. Server system 2 has fragments 101, 102, and 104 available.

Because no end of stream indicator is listed in the media stream index available at the client, the client system may expect that additional fragments for the media stream are available even though fragment identifier 100 is the last identifier listed in the media stream index. The client system can request a fragment corresponding to a next sequential increment of the last fragment identifier listed in the media stream index.

In this example, the client system would request a fragment with the identifier 101 from the proxy (e.g., when the number of buffered fragments falls below a minimum threshold level). The proxy can request the fragment with the identifier 101 from every server system connected to the proxy (failover system) until either the fragment 101 is returned to the proxy or every server system has returned an error message to the proxy (e.g., a 503 error message). In this case though, server system 2 would return the fragment 101 for the media stream to the proxy and the client system respectively. The client system buffers fragment 101 for processing. The client system can request a fragment corresponding to a next sequential increment 102 from the proxy and would receive the fragment 102 in return from server system 2.

This process can continue until all potentially missing fragments for the media stream have been received or consecutive failures exceeding the limit for failed requests have been returned. In this example, the client system can request fragment 103 as the next sequential increment to the last received fragment 102, but would receive an error message in return, because neither server system 1 nor server system 2 stores the fragment 103.

Since the maximum number of failed requests, which is 2 in this example, has not been reached, the client system can request fragment 104 as the next sequential increment to the last requested fragment 103. Server system 2 would return the fragment 104 to the proxy and the client system respectively. The client system can continue to request fragment 105 and then 106 as the next sequential increments to the last received fragment 104, but server systems 1 and 2 would return error messages since neither server stores these fragments. Because the maximum number of failed requests has been reached, the client system would abort the recovery process.

The following example illustrates, but does not limit, the above described process 600 with respect to "dropped" fragment identifiers in a media stream index (dropout). In this example, a client system plays back a media stream by requesting fragments listed in a media stream index. The client system identifies a gap in the sequential arrangement of fragment identifiers and attempts to sequentially retrieve fragments expected to be present within the gap. When a request is successful, the returned fragment(s) can be buffered and processed in sequential order. When more than a defined number of requests fail to return a fragment, the media stream recovery process is aborted and the client system may resume playback of the media stream at the first fragment listed in the media stream index after the identified gap.

For example, a media stream index that a client system received from server system 1 through a proxy references consecutive sequentially arranged fragment identifiers from 1 to 100 (incremented by 1) and 108-200. The client system requests fragments corresponding to the fragment identifiers and the last buffered fragment is fragment 98. The maximum number of failed requests is set to 2. Server system 2 has fragments 101, 102 and 104 available. The client system may expect that additional fragments for the media stream within the gap are available even though these fragments are not listed in the media stream index. The client system can request a fragment corresponding to a next sequential increment of the last fragment identifier listed in the media stream index before the identified gap.

In this example, the client system would request a fragment with the identifier 101 from the proxy (e.g., when the number of buffered fragments falls below a minimum threshold level). The proxy can request the fragment with the identifier 101 from every server system connected to the proxy (failover system) until either the fragment 101 is returned to the proxy or every server system has returned an error message to the proxy (e.g., a 503 error message). Server system 2 would return the fragment 101 for the media stream to the proxy and the client system respectively. The client system buffers fragment 101 for processing. The client system can request a fragment corresponding to a next sequential increment 102 from the proxy and would receive the fragment 102 in return from server system 2.

This process can continue until all fragments for the media stream that are expected to be present within the gap have been received or consecutive failures exceeding the limit for failed requests have been returned. In this example, the client system can request fragment 103 as the next sequential increment to the last received fragment 102, but would receive an error message in return, because neither server system 1 nor server system 2 stores the fragment 103.

Since the maximum number of failed requests, which is 2 in this example, has not been reached, the client system can request fragment 104 as the next sequential increment to the last requested fragment 103. Server system 2 would return the fragment 104 to the proxy and client system respectively. The client system can continue to fragment 105 and then 106 as the next sequential increments to the last received fragment 104, but server systems 1 and 2 would return error messages since neither server stores these fragments. Because the maximum number of failed requests has been reached, the client system would abort the recovery process and resume playback at fragment 108, which is the first fragment listed in the media stream index after the identified gap.

Figure 7:
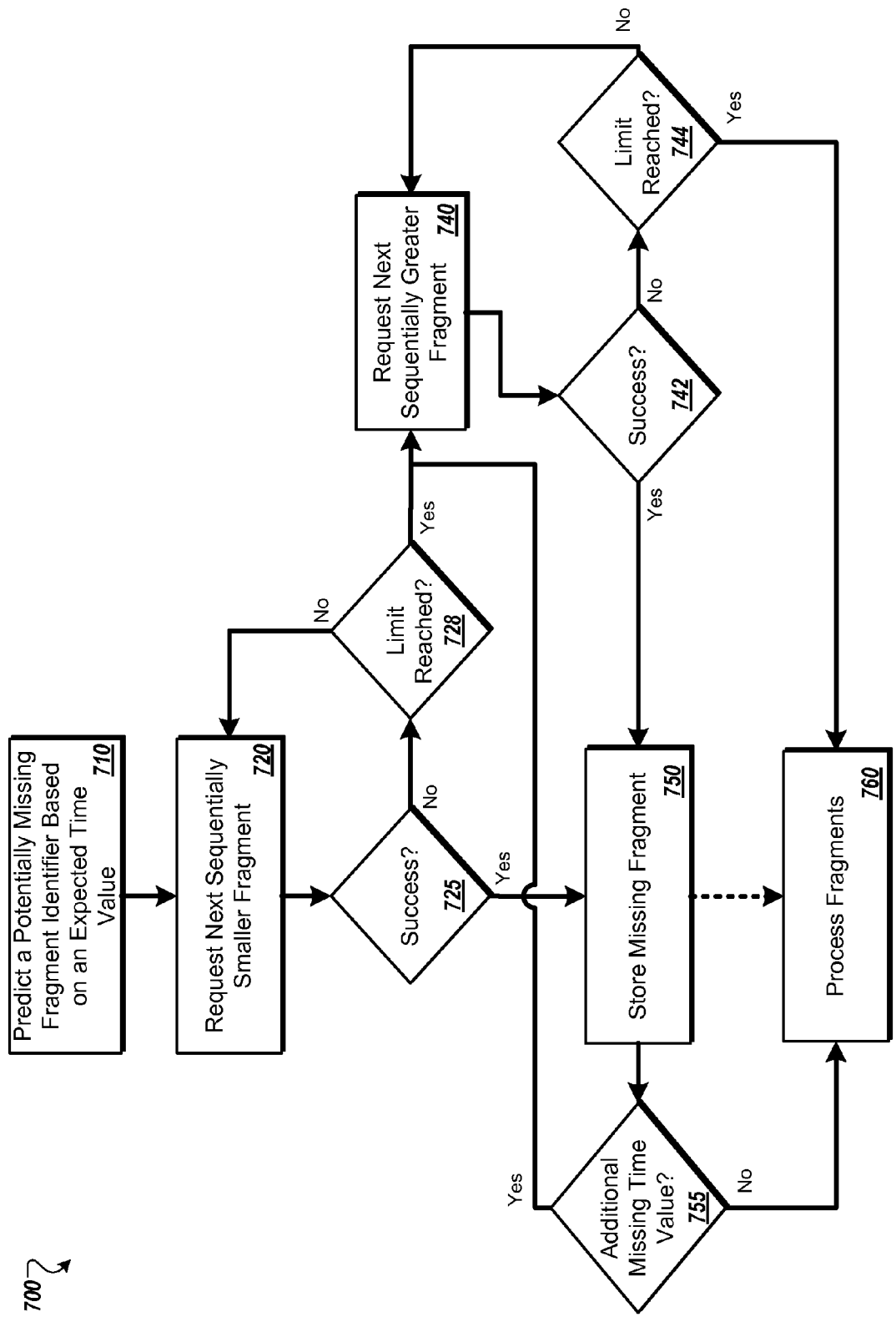
FIG. 7 shows an example of a process for requesting potentially missing fragments of a media stream based on expected time values.

FIG. 7 shows an example of a process 700 for requesting potentially missing fragments of a media stream based on time values. Potentially missing fragment identifiers in a media stream index can be identified as described above. A client system, or a component thereof, (e.g., a media player device) can playback a media stream. The client system can consider time values corresponding to playback duration of a media stream during playback. A time value can be referenced to a fragment number corresponding to a fragment that likely includes the respective time value.

In some implementations, every fragment can begin with a keyframe and a fragment number can be mapped to the fragment start time. For example, a fragment number corresponding to a fragment start time can be determined by:

$$\text{Fragment identifier} = \text{floor}(\text{fragment\_start\_time}/\text{fragment\_interval}) + 1$$

In some instances, fragment numbers can be skipped, for example when an encoder does not generate a keyframe at the proper fragment interval indicating the beginning of a new fragment. A skip does not necessarily indicate that media stream content is missing, but rather that a fragment may cover the content of more than one fragment interval.

In some implementations, a missing time value, or a range of time values, can be identified, for example from data included in the media stream index. The media stream index can include the time values covered by each listed fragment (e.g., fragment 1 can include 0-11 seconds, fragment 2 can include 12-19 seconds, fragment 3 can include 20-39 seconds, etc.) and a discontinuity in time values can indicate a gap in the fragments listed in the media stream index (e.g., the next available fragment 5 includes 49-60 seconds and no fragment is listed to cover 40-48 seconds). Upon identification of a gap (e.g., a range of potentially missing time values), a potentially missing fragment identifier can be predicted based on an expected time value 710. For example, the potentially missing fragment identifier can be predicted based on a relationship of fragment time interval and the identified expected time value:

Predicted Fragment Identifier=ceiling(expected time value/fragment time interval)

A fragment corresponding to a next sequentially smaller fragment identifier than the predicted fragment identifier, which is expected to include the identified time value, can be requested 720 (backward fetch phase). If the requested fragment has been located, it can be retrieved, and the client system can verify that the retrieved fragment includes the expected time value. If the received fragment includes the expected time value, the request succeeds 725 and the fragment can be stored 750 (e.g., in a buffer storage) for processing 760, and the recovery process can continue if additional expected time values are missing 755 in the media stream.

If the request fails, the client system can request another fragment corresponding to the next sequentially smaller increment of the last requested fragment identifier 720. If a fragment with the next sequentially smaller increment is identified, the client system can verify whether the fragment includes the expected time value. If the request succeeds 725, the identified fragment can be stored 750 for processing 760, and the recovery process can continue if additional expected time values are missing 755 in the media stream. The recovery process can continue until a fragment including the expected time value has been retrieved or a limit of failed requests 728 has been reached.

In some implementations, an optimal number of failed requests during the backward fetch phase can be determined based on guidelines, such as, the maximum number of failed requests should be greater or equal to the ratio of a maximum real fragment duration and a fragment time interval (e.g., ceiling (maximum real fragment duration/fragment time interval)), increasing the number of maximum failures may increase the likelihood that a fragment containing the expected time value will be retrieved, increasing the number of maximum failures may result in additional requests for potentially missing fragments and may increase server system or network loads, or increasing the number of maximum failures may result in client systems retrieving unused fragments and may increase server system or network loads.

If a limit of failed requests for sequentially smaller increments of potentially missing fragment identifiers has been reached, or no fragments including the expected time value were identified during the backward fetch phase, the client system can request a fragment corresponding to the next sequentially greater fragment identifier 740 (i.e., the predicted fragment identifier) than the first requested fragment predicted fragment identifier (forward fetch phase). If the requested fragment corresponding to the next sequentially greater fragment identifier has been located, the request succeeds 742, the fragment can be stored 750 for processing 760, and the recovery process can continue if additional expected time values are missing 755 in the media stream.

In some implementations, it is irrelevant whether the requested fragments during the forward fetch phase include the expected time value, because the requested fragment must include a time value that is greater or equal to the expected time value. If the request fails, the client system can request a fragment corresponding to the next sequentially greater increment of the last requested fragment identifier. The recovery process can continue until a fragment corresponding to the requested fragment identifier has been retrieved or a limit of failed requests 744 has been reached.

In some implementations, an optimal number of failed requests during the forward fetch phase can be determined based on guidelines, such as, the maximum number of failed requests should be smaller than a ratio of live offset time and fragment time interval (e.g., ceiling (live offset time/fragment time interval), meaning that where the keyframe is reasonably in sync with the fragment time interval a value of 2 may be sufficient, where the keyframe interval is in sync with the fragment time interval a value of 1 may be sufficient, or where the keyframe interval is out of sync with the fragment time interval, a value greater than 2 may be necessary), increasing the number of maximum failures may result in additional requests for potentially missing fragments and may increase server system and network loads, or increasing the number of maximum failures may add tolerance to short system-wide encoder outages.

The following example illustrates, but does not limit, the above described process 700 with respect to requesting potentially missing fragments of a media stream based on time values. In this example, a client system plays back a media stream by requesting fragments listed in a media stream index. The client system identifies a gap in the sequential arrangement of fragment identifiers and attempts to retrieve fragments that include a time value expected to be present within the gap. When a request is successful, the returned fragment will be buffered and processed in sequential order. When more than a defined number of requests fail to return a fragment, the media stream recovery process is aborted and the client system may resume playback of the media stream at the first fragment listed in the media stream index after the gap.

For example, a media stream index that a client system received from a server system 1 through a proxy references consecutive sequentially arranged fragment identifiers from 1 to 11 and 20-200 (incremented by 1). The fragment interval is 10 seconds and the keyframe interval is close to 10 seconds, but deviates sometimes resulting in skips. A next time value the client system expects a potentially missing fragment to include is 145 seconds. The maximum number of failed backwards requests is set to 2 and the maximum number of failed forward requests is set to 2. Server system 2 has fragments 12-19 for the media stream available. The client system may expect that additional fragments for the media stream within the gap are available even though these fragments are not listed in the media stream index. The client system can request a fragment that potentially includes a time value the client system expects to be present within the identified gap.

In this example, the client system can predict a potentially missing fragment identifier by a relationship between the expected time value and the fragment time interval, i.e., ceiling (145 sec./10 sec.)=15. During the backward fetch phase, the client system can request a next smaller increment of the predicted fragment identifier 15, such as fragment identifier 14. Since a fragment corresponding to the fragment identifier 14 is available on server system 2, fragment 14 can be retrieved and the client system can verify whether fragment 14 includes the expected time value.

If the fragment 14 includes the expected time value, the fragment can be stored (e.g., in a buffer storage) for processing. If the fragment 14 does not include the expected time value, the client system can request another fragment corresponding to a next smaller increment of the last requested fragment identifier, such as fragment identifier 13. Fragment 13 can be retrieved from the server system 2 and the client system can verify whether fragment 13 includes the expected time value. If fragment 13 includes the expected time value, the fragment can be stored for processing. If fragment 13 does not include the expected time value, the backward fetch phase may be aborted since the maximum number of failed requests for the backward fetch phase is set to 2 and both requests, the request for fragment 14 and 13 have failed.

If the backward fetch phase did not produce a fragment including the expected time value, the client system can revert to the forward fetch phase and request a fragment corresponding to next sequentially greater increment that the first requested fragment identifier during the backward fetch phase, such as fragment identifier 15 (i.e., the predicted fragment identifier). Server system 2 has fragment 15 available and the client system can retrieve fragment 15. Since fragment 15 must include a time value that is greater or equal to the expected time value, it may not be necessary for the client to verify whether fragment 15 includes the expected time value.

Fragment 15 can be stored for processing. In a case where fragment 15 is not available, the client system can request another fragment corresponding to a next sequentially greater fragment identifier, such as fragment identifier 16. If fragment 16 is also not available on the server systems, the client system may abort the forward fetch phase since the maximum number of failed requests for the forward fetch phase is set to 2 and both requests, the request for fragment 15 and 16 have failed.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language stream), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending streams to and receiving streams from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising a client system operable to interact with a server system and to perform operations comprising:
    receiving an index of a media stream, wherein (a) the media stream comprises multiple sequentially arranged fragments, (b) each of the fragments has an associated identifier, and (c) the index comprises a list of fragment identifiers;
    determining a naming convention that indicates an ordered arrangement of the fragment identifiers in the index;
    identifying a gap in the list of fragment identifiers based, at least in part, on the determined naming convention, wherein the gap comprises one or more potentially missing fragment identifiers;
    requesting, from the server system, (a) a first potentially missing fragment associated with an identifier that corresponds to a predetermined increment to a last available fragment identifier before the gap in the list, and (b) a second potentially missing fragment associated with an identifier that corresponds to a next predetermined increment to the identifier associated with the first potentially missing fragment, wherein the potentially missing fragments are requested in series until a predetermined number of requests fail to return a potentially missing fragment; and
    receiving one or more of the potentially missing fragments associated with the potentially missing fragment identifiers.

2. The system of claim 1, wherein the predetermined increment and the next predated increment are at least partially based on a range of potentially missing fragment identifiers encompassed by the gap.

3. The system of claim 1, wherein receiving the index comprises:
    receiving an initial portion of the index; and
    receiving a subsequent portion of the index after receiving one or more of the potentially missing fragments.

4. The system of claim 1, wherein the naming convention comprises at least one a time stamp and a numbering scheme.

5. The system of claim 1, wherein
    the operations further comprise identifying an end of media stream indicator in the index; and the potentially missing fragments are requested in series until either (a) the predetermined number of requests fail to return a potentially missing fragment, or (b) the end of media stream indicator indicates that all potentially missing fragments have been requested.

6. The system of claim 1, wherein the operations further comprise:
   storing the received fragments in a buffer; and
   processing the buffered fragments for display on a display coupled to the client system.

7. The system of claim 1, wherein:
   the operations further comprise storing the received fragments in a buffer; and
   the potentially missing fragments are requested only when the buffer is below a minimization threshold fill level.

8. The system of claim 1, wherein the server system is operable to request the potentially missing fragments from one or more origin servers.

9. The system of claim 1, wherein identifying the gap comprises identifying a last fragment in the list based on the determined naming convention.

10. A method performed by a data processing apparatus, the method comprising:
    receiving, at a client system, an index of a media stream, wherein (a) the media stream comprises multiple sequentially arranged fragments, (b) each of the fragments has an associated identifier, and (c) the index comprises a list of fragment identifiers;
    determining a naming convention that indicates an ordered arrangement of the fragment identifiers in the index;
    identifying a gap in the list of fragment identifiers based, at least in part, on the determined naming convention, wherein the gap comprises one or more potentially missing fragment identifiers;
    requesting, from a server system, one or more potentially missing fragments that are respectively associated with the one or more potentially missing fragment identifiers, wherein the potentially missing fragments are requested sequentially until either (a) all of the potentially missing fragments are received, or (b) a predetermined number of requests fail to return a potentially missing fragment; and
    receiving at least one potentially missing fragments from the server system.

11. The method of claim 10, wherein identifying the gap comprises:
    checking a timestamp of a last update of the index;
    determining a time difference between the timestamp and a current time value; and
    comparing the determined time difference to a predetermined time interval.

12. The method of claim 10, wherein the potentially missing fragments are requested based on (a) incrementally smaller fragment identifiers and (b) incrementally greater fragment identifiers, than an intermediate potentially missing fragment identifier.

13. The method of claim 10, wherein identifying the gap further comprises identifying a last fragment identifier in the list based, at least in part, on the determined naming convention.

14. The method of claim 10, wherein identifying the gap further comprises identifying a discontinuity of fragment identifiers in the list based, at least in part, on the determined naming convention.

15. The method of claim 10, wherein requesting the one or more potentially missing fragments comprises requesting (a) a first potentially missing fragment associated with an identifier that corresponds to a predetermined increment to a last available fragment identifier before the gap in the list, and (b) a second potentially missing fragment associated with an identifier that corresponds to a next predetermined increment to the identifier associated with the first potentially missing fragment.

16. A non-transitory computer readable medium encoded with a computer program, the program comprising instructions that, when executed by a data processing apparatus, cause the data processing apparatus to perform operations comprising:
    receiving, at a client system, an index of a media stream, wherein (a) the media stream comprises multiple sequentially arranged fragments, (b) each of the fragments has an associated identifier, and (c) the index comprises a list of fragment identifiers;
    determining a naming convention that indicates an ordered arrangement of the fragment identifiers in the index;
    identifying a gap in the list of fragment identifiers based, at least in part, on the determined naming convention, wherein the gap comprises one or more potentially missing fragment identifiers;
    requesting, from a server system, one or more potentially missing fragments that are respectively associated with the one or more potentially missing fragment identifiers, wherein the potentially missing fragments are requested sequentially until a predetermined number of requests fail to return a potentially missing fragment; and
    receiving at least one potentially missing fragment from the server system.

17. The computer readable medium of claim 16, wherein identifying the gap further comprises identifying a discontinuity of fragment identifiers in the list based, at least in part, on the determined naming convention.

18. The computer readable medium of claim 16, wherein the operations further comprise processing the received fragments for display.

19. The computer readable medium of claim 16, wherein the operations further comprise displaying the received fragments as part of the media stream.

20. The computer readable medium of claim 16, wherein the potentially missing fragments are requested sequentially until either (a) all of the potentially missing fragments are received, or (b) the predetermined number of requests fail to return a potentially missing fragment.

* * * * *